US009994181B1

(12) United States Patent
Dubaisi et al.

(10) Patent No.: US 9,994,181 B1
(45) Date of Patent: Jun. 12, 2018

(54) VEHICLE SEAT INCLUDING AIRBAG

(71) Applicant: Ford Global Technologies, LLC, Dearborn, MI (US)

(72) Inventors: Adnan Dubaisi, Dearborn, MI (US); Brian Robert Spahn, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/475,880

(22) Filed: Mar. 31, 2017

(51) Int. Cl.
*B60R 21/207* (2006.01)
*B60R 21/231* (2011.01)
*B60R 21/239* (2006.01)
*B60R 21/233* (2006.01)
*B60R 21/26* (2011.01)

(52) U.S. Cl.
CPC .......... *B60R 21/207* (2013.01); *B60R 21/233* (2013.01); *B60R 21/239* (2013.01); *B60R 21/23138* (2013.01); *B60R 21/26* (2013.01); *B60R 2021/23146* (2013.01)

(58) Field of Classification Search
CPC .................. B60R 21/207; B60R 21/23138
See application file for complete search history.

(56) References Cited

U.S. PATENT DOCUMENTS

| 5,636,862 | A * | 6/1997 | Cheung | B60R 21/207 280/730.2 |
| 5,799,971 | A | 9/1998 | Asada | |
| 6,478,329 | B1 | 11/2002 | Yokoyama | |
| 7,549,672 | B2 | 6/2009 | Sato et al. | |
| 8,353,527 | B2 * | 1/2013 | Sugimoto | B60R 21/207 280/730.2 |
| 8,596,675 | B2 * | 12/2013 | Kwon | B60R 21/233 280/729 |
| 8,690,187 | B2 * | 4/2014 | Fukawatase | B60R 21/207 280/730.2 |
| 9,039,035 | B1 * | 5/2015 | Faruque | B60R 21/207 280/728.2 |
| 9,365,180 | B2 | 6/2016 | Acker et al. | |
| 9,707,922 | B2 * | 7/2017 | Wiik | B60R 21/23138 |
| 2006/0012155 | A1 * | 1/2006 | Shaner | B60R 21/23138 280/730.2 |
| 2006/0119082 | A1 * | 6/2006 | Peng | B60R 21/23138 280/730.2 |
| 2006/0119083 | A1 * | 6/2006 | Peng | B60R 21/207 280/730.2 |

(Continued)

FOREIGN PATENT DOCUMENTS

| JP | 5104105 B2 | 12/2012 | | |
| WO | WO-2017099398 A1 * | 6/2017 | ............. | B60R 21/16 |

*Primary Examiner* — Faye M Fleming
(74) *Attorney, Agent, or Firm* — Frank A MacKenzie; Bejin Bieneman PLC

(57) ABSTRACT

A vehicle seat includes a seatback extending from a first side to a second side. An airbag assembly having a housing is supported by the seatback at one of the first and second sides. An airbag is inflatable from the housing to an inflated position. In the inflated position, the airbag has a first leg extending away from the seatback and a second leg spaced from the seatback, and extending from the first leg in a cross-seatback direction to a distal end of the second leg. A panel extends from the distal end of the second leg to the housing.

17 Claims, 6 Drawing Sheets

(56) References Cited

U.S. PATENT DOCUMENTS

| | | | |
|---|---|---|---|
| 2006/0131847 A1* | 6/2006 | Sato | B60R 21/207 280/730.2 |
| 2015/0115576 A1* | 4/2015 | Acker | B60R 21/23138 280/728.2 |
| 2016/0167616 A1 | 6/2016 | Wiik | |

* cited by examiner

VEHICLE SEAT INCLUDING AIRBAG

BACKGROUND

Vehicles may include a variety of passive restraint systems, including airbags that can deploy during a vehicle impact. Airbags can assist in absorbing energy from vehicle occupants during the impact. The airbag may be a component of an airbag assembly, including a housing supporting an airbag, and an inflator in communication with the airbag for inflating the airbag from an uninflated position to an inflated position.

The vehicle may include an impact sensing system in communication with the airbag assembly for sensing a vehicle impact and instructing the inflator to inflate airbags when a vehicle impact is sensed. The impact sensing system may sense the direction of the impact and may selectively inflate, or not inflate, certain airbags of the vehicle, or extensions of the airbag, based on the type and magnitude of impact that is sensed, e.g., based on direction, magnitude, etc.

Vehicles are subject to a variety of impact tests. These impact tests may include those standardized by the National Highway Traffic and Safety Agency (NHTSA). These impact tests may include, for example, oblique impact tests. One such test is the small overlap rigid barrier (SORB) test in which the vehicle is impacted in a front corner of the vehicle at an oblique angle with a rigid barrier. In this test, a test dummy in a front passenger seat may be urged forwardly and toward the impacted corner of the vehicle.

Another type of impact test is the NHTSA frontal oblique impact test. In this test, the test dummy in the front passenger seat is urged in a cross-vehicle direction toward a driver side door of the vehicle or toward a passenger side door of the vehicle depending on whether the oblique impact is on a left or a right side of the vehicle.

DETAILED DESCRIPTION

Figure 1:
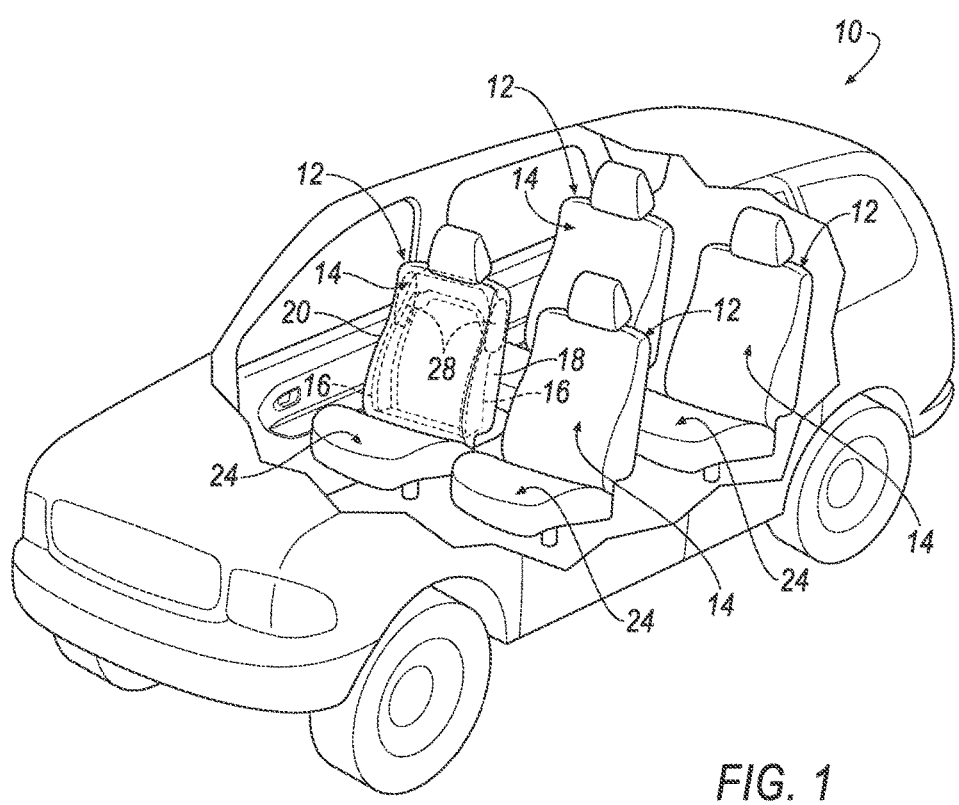
FIG. 1 is a perspective view of an example vehicle with a cutaway to show vehicle seats.

Referring to the Figures, wherein like numerals indicate like parts throughout the several views, a vehicle 10 includes one or more vehicle seats 12. A vehicle seat 12 includes a seatback 14 extending from a first side 18 to a second side 20. The vehicle seat 12 includes an airbag assembly 26. The airbag assembly 26 includes a housing 28 supported by the seatback 14 at the first side 18 of the seatback 14. Additionally, or alternatively, the airbag assembly 26 can be supported by the seatback 14 at the second side 20 of the seatback 14, i.e., the vehicle seat 12 may include one airbag assembly 26 on either the first side 18 or the second side 20, or may include two airbag assemblies 26 with one on the first side 18 and the other on the second side 20.

Figure 2:
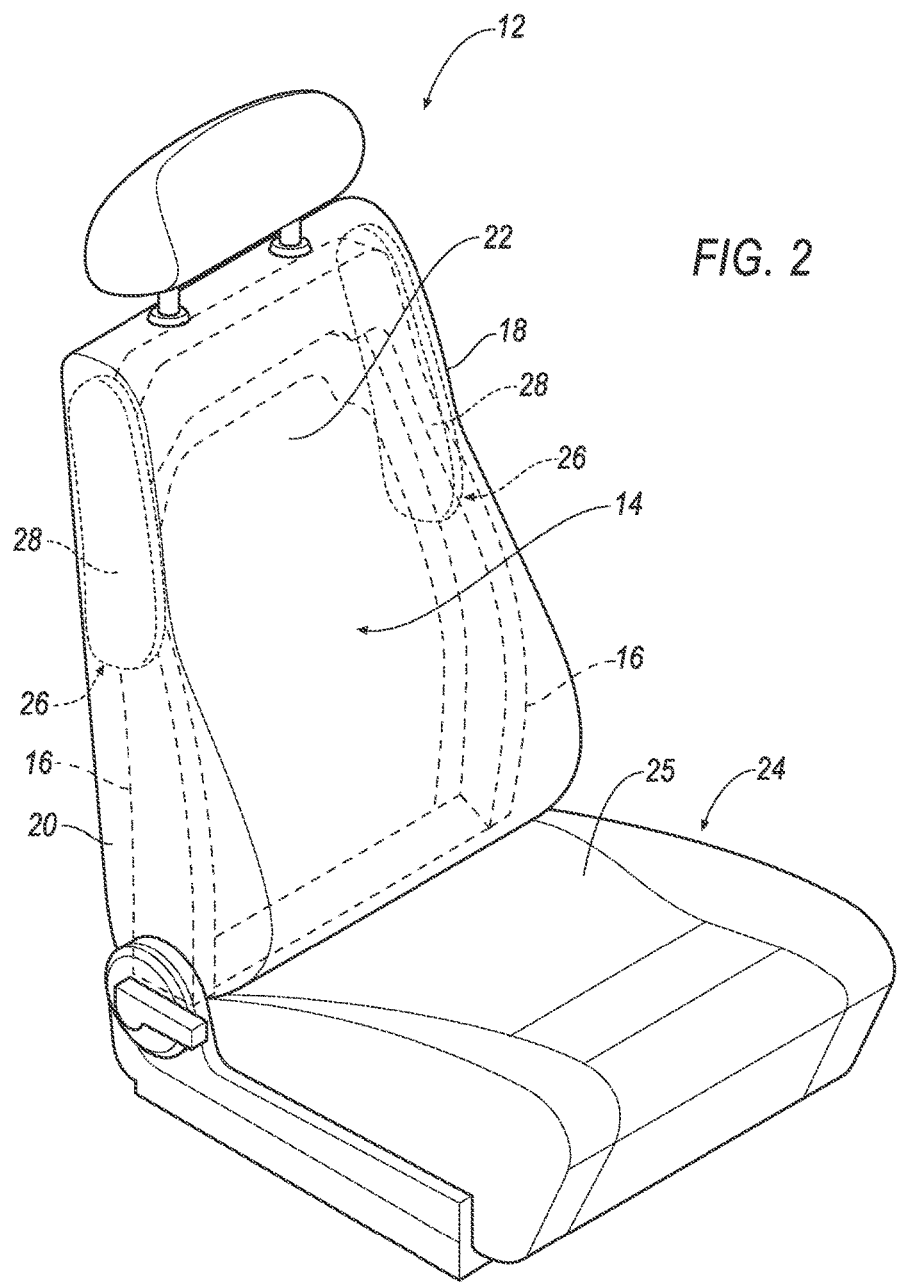
FIG. 2 is a perspective view of an example of a front passenger vehicle seat.
Figure 3:
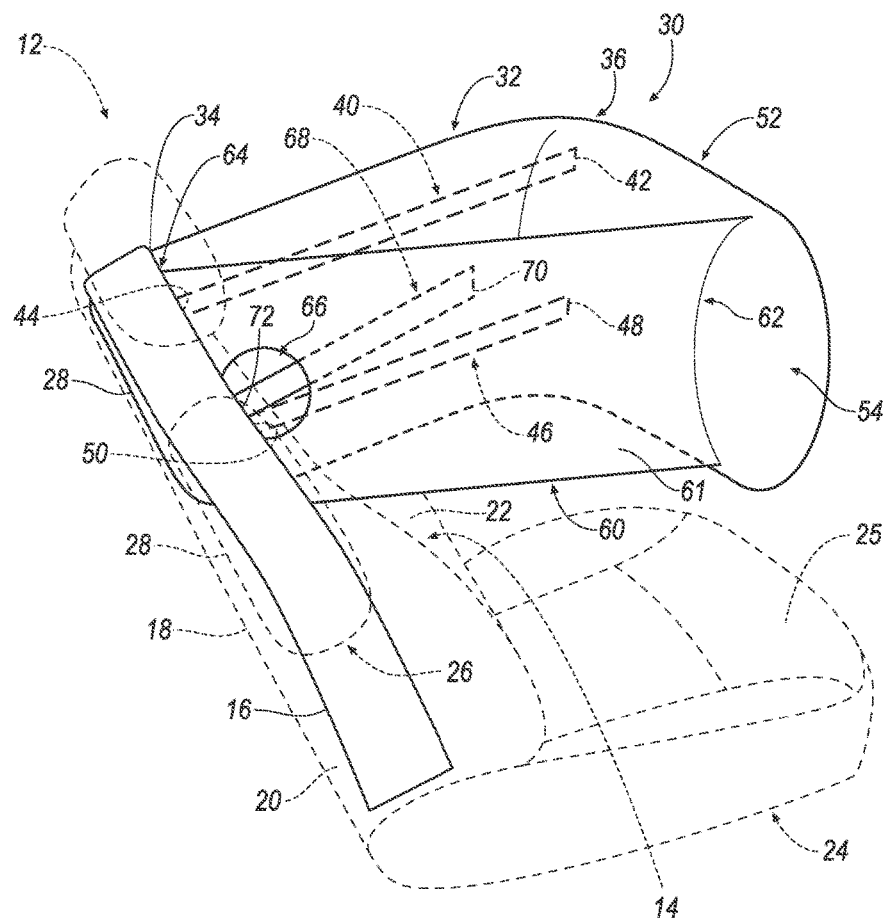
FIG. 3 is a perspective view of the example of the front passenger vehicle seat from FIG. 2 in hidden line, with an airbag of an airbag assembly at a first side of front passenger vehicle seat deployed to an inflated position, and an airbag of an airbag assembly at a second side of the front passenger vehicle seat not deployed.
Figure 4:
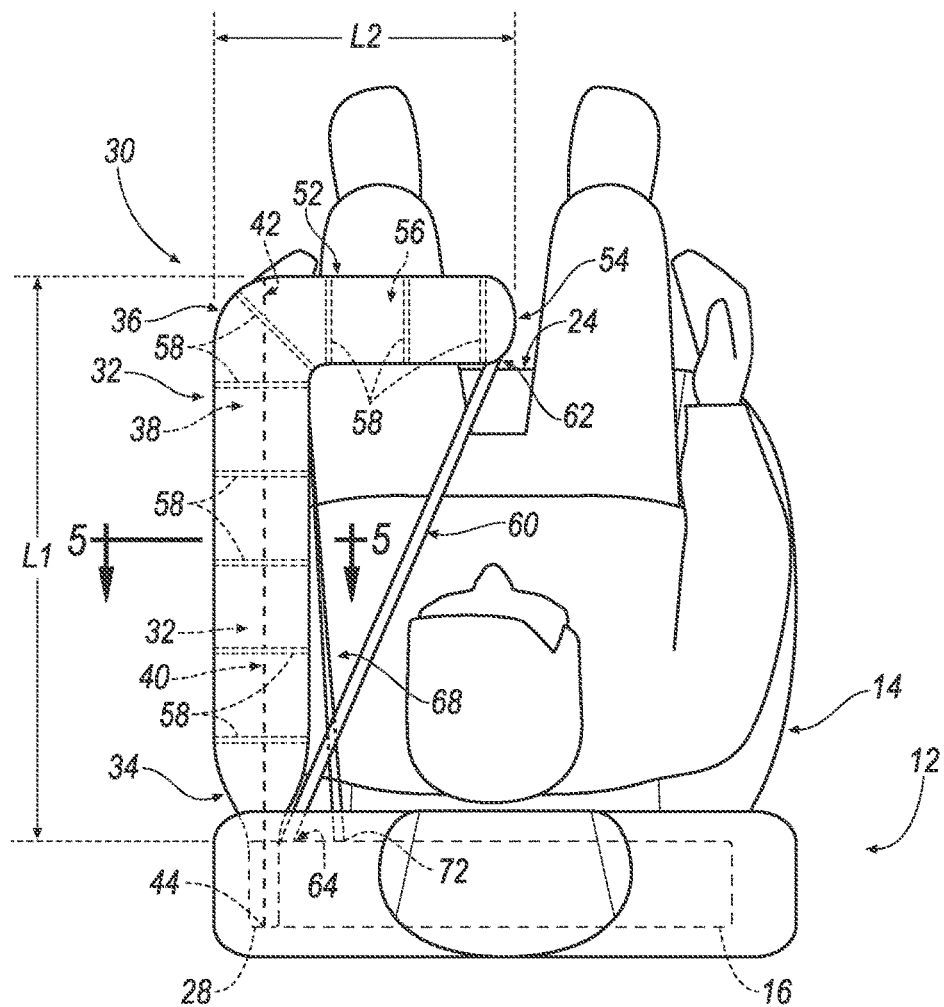
FIG. 4 is a top view of the example of the vehicle seat in FIGS. 2 and 3 with the airbag of the airbag assembly at the first side of the vehicle seat deployed to the inflated position.

In the example where the vehicle seat 12 includes two airbag assemblies 26, the airbag 30 of each airbag assembly 26 can inflate from the housing 28 from an uninflated position, as shown in FIGS. 1 and 2, to an inflated position, as shown in FIGS. 3 and 4. In the inflated position, the airbag 30 includes a first leg 32 extending away from the seatback 14, and a second leg 52 spaced from the seatback 14 and extending from the first leg 32 in a cross-seatback direction, i.e., a cross-vehicle direction. The airbag 30 includes a panel 60 extending from a distal end 54 of the second leg 52 to the housing 28 of the airbag 30. For example, the panel 60 can have a first side 62 fixed to the distal end 54 of the second leg 52 and a second side 64 fixed to the housing 28 of the airbag assembly 26.

During an impact of the vehicle 10, one, both, or neither of airbags 30 of the airbag assemblies 26 may selectively deploy based on a direction of the impact in accordance with a passive restraint system 74, as further discussed below. For example, following an impact to a front driver-side corner of the vehicle 10, the airbag 30 of the airbag assembly 26 supported at the first side 18 of the seatback 14 may deploy to the inflated position, while the airbag 30 of the airbag assembly 26 supported at the second side 20 of the seatback 14 may not.

Under these conditions, occupants of vehicle seats 12 may be urged in a forward-left direction relative to the vehicle 10. The occupants may thus contact the panel 60 of the airbag 30 of the airbag assembly 26, absorbing energy from the occupant. The panel 60 may also assist in urging the occupant toward additional airbags in the vehicle 10.

For example, in an example where the vehicle seat 12 is positioned as a front passenger seat, during an impact that urges the occupant in a forward-left direction, the airbag 30 of the airbag assembly 26 supported on the first side 18 of the seatback 14 may deploy to the inflated position, while the airbag 30 of the airbag assembly supported at the second side 20 is not inflated. Specifically, the panel 60 of the airbag 30 of the airbag assembly 26 supported at the first side 18 of the seatback 14 may urge the occupant toward a passenger side airbag. In this way, the airbag 30 may absorb energy from the occupant, assist in diverting the occupant from contacting other occupants during the impact (e.g., an occupant in a driver vehicle seat), and urge the occupant toward the passenger side airbag. The passenger side airbag, e.g., an airbag mounted in a dashboard of the vehicle 10 forward of the occupant in the front passenger vehicle seat, may absorb additional energy from the occupant.

On the other hand, in an impact that urges the occupant in a forward-right direction, e.g., an impact to a front passenger-side corner of the vehicle 10, the airbag 30 of the airbag assembly 26 supported at the second side 20 of the seatback 14 may deploy to the inflated position, while the airbag 30 of the airbag assembly 26 supported at the first side 18 is not inflated. Under these conditions, the occupant in the front passenger vehicle seat may urged in a forward-right direction. As a result, the occupant may contact the panel 60 of the airbag 30 of the airbag assembly 26 supported by the seatback 14 at the second side 20, absorbing energy from the occupant. In addition, the panel 60 may assist in diverting the occupant from contacting a passenger side door of the vehicle 10, and urge the occupant toward, e.g., the passenger side airbag, which may absorb additional energy from the occupant.

As shown in FIG. 1, the vehicle 10 is a sport utility vehicle. The vehicle 10 can be any type of automobile, such as a car, a truck, a crossover vehicle, a van, a minivan, etc. The vehicle 10 may be powered in a variety of known ways, e.g., with an electric motor and/or internal combustion engine.

The vehicle 10 may be an autonomous vehicle. Autonomous vehicles use a variety of sensors and computing devices to operate the vehicle with various levels of input from a human driver. The computing device of the vehicle 10 may operate the vehicle 10 in an autonomous mode, a semi-autonomous mode, or a non-autonomous mode. An autonomous mode is defined as one in which each of vehicle propulsion, braking, and steering are controlled by the computer; in a semi-autonomous mode the computing device controls one or two propulsion, braking, and steering of the vehicle 10; in a non-autonomous mode, a human operator controls the propulsion, braking, and steering of the vehicle 10.

The Society of Automotive Engineers (SAE) has defined multiple levels of autonomous vehicle operation. At levels 0-2, the human driver monitors or controls almost all driving tasks, often with no help from the vehicle 10. For example, at level 0 ("no automation"), a human driver is responsible for all vehicle 10 operations. At level 1 ("driver assistance"), the vehicle 10 sometimes assists with steering, acceleration, or braking, but the human driver is still responsible for much of the vehicle 10 control. At level 2 ("partial automation"), the vehicle 10 can control steering, acceleration, and braking under certain circumstances without human interaction. At levels 3-5, the vehicle 10 assumes more driving-related tasks. At level 3 ("conditional automation"), the vehicle 10 can handle steering, acceleration, and braking under certain circumstances, as well as driving environment monitoring. Level 3 still requires the human driver to intervene occasionally. At level 4 ("high automation"), the vehicle 10 can handle the same tasks as at level 3, but without relying on the human driver to intervene in certain driving modes. At level 5 ("full automation"), the vehicle 10 can handle almost all tasks without any human driver intervention.

As discussed above, the vehicle 10 can include one or more vehicle seats 12, as shown in FIG. 1. The one or more vehicle seats 12, e.g., the driver vehicle seat, the front passenger vehicle seat, etc., can have seatbacks 14 that include the airbag assemblies 26 supported at the first side 18 of the seatback 14, and/or the second side 20 of the seatback 14.

In the example of the vehicle seat 12 shown in FIG. 2, the vehicle seat 12 is a single-occupancy seat. That is, the vehicle seat 12 is sized and shaped to receive a single occupant. Additionally, or alternatively, the vehicle seat 12 could be sized and shaped to receive multiple occupants, e.g., two.

Referring to FIG. 2, an example of the front passenger vehicle seat according to this disclosure is shown. The front passenger vehicle seat is generally oriented in a forward-facing position, i.e., in a direction in which an occupant of the vehicle seat 12 would be facing in a direction toward a front of the vehicle 10. Alternatively, the vehicle seat 12 could be oriented in a rearward-facing position. In the rearward-facing position, the occupant of the vehicle seat 12 would be facing in a direction toward a rear of the vehicle 10. As used herein, the phrase "front of the vehicle" refers to an end of the vehicle 10 that is furthest forward in a direction in which the vehicle 10 generally moves. The phrase "rear of the vehicle" refers to an end of the vehicle 10 furthest rearward in the direction in which the vehicle 10 generally moves.

For example, a base (not shown) could allow the vehicle seat 12 to rotate from the forward-facing position to the rearward-facing position. Additionally, the base may allow the vehicle seat 12 to be secured in a plurality of positions between the forward and rearward-facing positions. The base can attach to a floor of the vehicle 10 at one end, and support a seat bottom 24 of the vehicle seat 12 at another end.

The base may attach to the floor such that the vehicle seat 12 can slidably move relative to the floor in a vehicle 10 fore-aft direction, i.e., in the direction toward the front of the vehicle 10, and in the direction toward the rear of the vehicle 10. In addition, the base may attach to the floor to allow the vehicle seat 12 to move in a cross-vehicle direction relative to the vehicle floor. The passive restraint system 74 may be programmed not to deploy the airbag 30 of the airbag assembly 26 supported at the first side 18 of the seatback 14 and/or the second side 20 of the seatback 14 in the event a vehicle seat 12 is not oriented in the forward-facing position during an impact, as further discussed below.

As shown in FIG. 2, the vehicle seat 12 includes the seat bottom 24, the seatback 14, a seatback frame 16, the airbag assembly 26 supported at the first side 18 of the seatback 14, and the airbag assembly 26 supported at the second side 20 of the seatback 14. As discussed above, while the example of the vehicle seat 12 shown in FIG. 2 includes two airbag assemblies 26 as disclosed herein, alternatively, the vehicle seat 12 may include only one airbag assembly 26, with the single airbag assembly 26 supported at either the first or the second side 18, 20 of the seatback 14.

As discussed above, the seat bottom 24 of the vehicle seat 12 may be supported by the base. For example, the seat bottom 24 can include a seat bottom frame (not shown) to which the base can fixably attach. The seat bottom frame can be formed of, e.g., metal, including steel, aluminum, etc., and other suitable materials, including plastic and/or composite materials, as well as a combination of materials. The seat bottom frame can support a foam cushion or the like having properties suitable for sitting upon. The seat bottom 24 can include an outer cover 25 of, e.g., cloth, leather or other suitable materials that cover the foam cushion and seat bottom frame. The seat bottom 24 can support the seatback 14.

The seatback 14 of the vehicle seat 12 can include the seatback frame 16. The seatback frame 16 is shown in hidden lines in FIGS. 1-3. The seatback 14 can be supported by the seat bottom 24. For example, an end of the seatback frame 16 can be attached to the seat bottom frame. The seatback 14 may extend upwardly from the seat bottom 24. In addition, the seatback 14 may recline relative to the seat bottom 24.

The seatback frame 16 can be formed of, e.g., metal, including steel, aluminum, etc., and other suitable materials, including plastic and/or composite materials, as well as a combination of materials. The seatback frame 16 can support a foam cushion or the like having properties suitable for sitting upon. The seatback 14 can include an outer layer of, e.g., cloth, leather or other suitable materials that cover the foam cushion of the seatback 14 and seatback frame 16.

As discussed above, the housing 28 of the airbag assemblies 26 are supported at the first and second sides 18, 20 of the seatback 14, respectively. For example, as shown in FIG. 2, the housing 28 of the airbag assembly 26 supported at the first side 18 of the seatback 14 can be supported by the seatback frame 16 at a location internal to the outer layer of material that can cover the seatback 14. Likewise, the housing 28 of the airbag assembly 26 supported at the second side 20 of the seatback 14 can be supported by the seatback 14 in a location internal to the outer layer of materials that can cover the seatback 14. For example, the housing 28s of the airbag assemblies 26 can be fixedly attached to the seatback frame 16 with fasteners, such as bolts, or in any other suitable manner.

If the airbag assemblies 26 are mounted interior to the outer cover 22 of the seatback 14, the outer cover 22 may include tear seams adjacent the internal locations of the airbag assemblies 26, through which the airbags 30 of the airbag assemblies 26 can deploy. The tear seams are configured to tear when the airbags 30 of the airbag assemblies 26 deploy. For example, the tear seams may be formed with a relatively weaker or thinner material than the seatback 14 cover material in other areas, and/or at a seam between two or more panels of material.

Alternatively, one or both the housings 28 of the airbag assemblies 26 can be supported by the first and second sides 18, 20 of the seatback 14 at locations external to the outer cover 22 of the seatback 14. For example, the outer cover 22 of the seatback 14 adjacent the first and second sides 18, 20 can include access openings (not shown). A mounting flange (not shown) on the housings 28 of the airbag assemblies 26 can extend through the access openings of the outer cover 22. In this way, the mounting flange of the airbag assemblies 26 can be attached to the seatback frame 16 via fasteners, e.g., bolts, or by other suitable means, e.g., adhesives.

FIG. 3 shows the example of the vehicle seat 12 positioned as a front passenger seat. The airbag 30 of the airbag assembly 26 supported at the first side 18 of the seatback 14 is deployed from the uninflated to the inflated position, while the airbag 30 of the airbag assembly 26 supported at the second side 20 of the seatback 14 has not deployed. As discussed above, the airbag 30 of the airbag assembly 26 supported at the first side 18 of the seatback 14 may deploy to the inflated position while the airbag 30 of the airbag assembly 26 supported at the second side 20 may not deploy following, e.g., an impact to a front driver-side corner of the vehicle 10, and, e.g., when the front passenger vehicle seat is generally oriented in the forward-facing position.

As shown in FIG. 3, when the airbag 30 is in the inflated position, the first leg 32 of the airbag 30 extends away from the first side 18 of the seatback 14 to a distal end 36 of the first leg 32. The first leg 32 defines a first inflation chamber 38. The distal end 36 of the first leg 32 extends from the housing 28 of the airbag assembly 26 to a first length L1, e.g., 20 inches.

The first leg 32 of the airbag 30 of the airbag assemblies 26 also includes a proximal end 34. The proximal end 34 of the first leg 32 is supported by the housing 28. For example, the proximal end 34 of the first leg 32 may be attached to the housing 28 with clips, fasteners, adhesives, etc.

Figure 5:
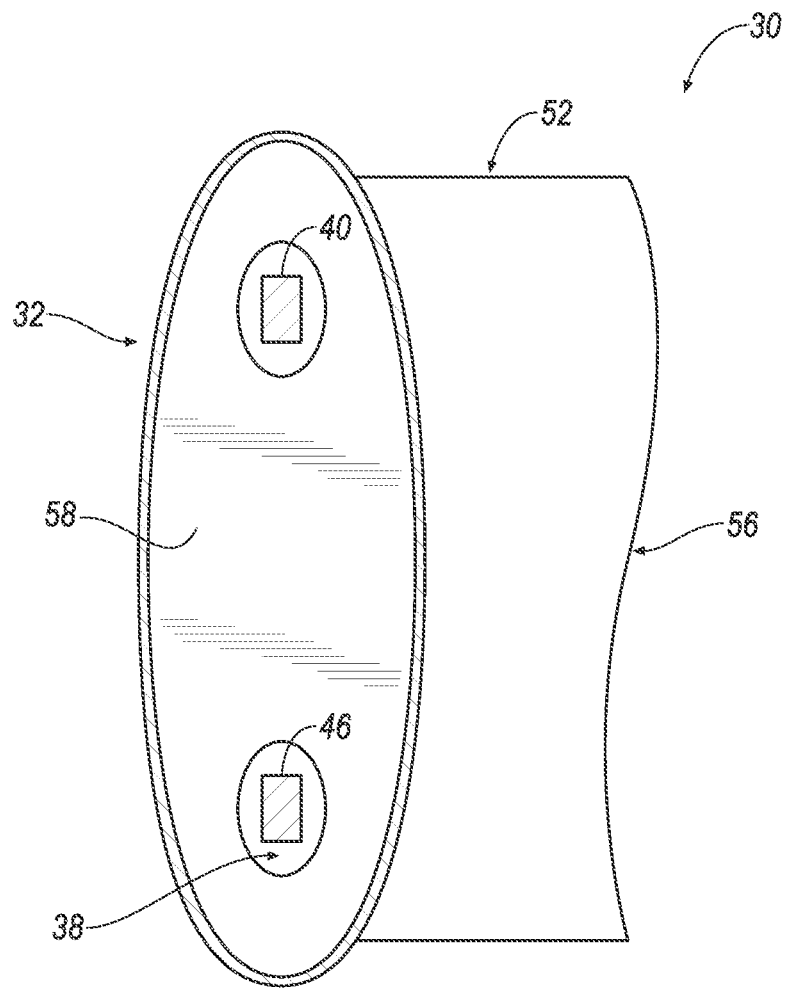
FIG. 5 is a cross-sectional view of the airbag along a line 5 from FIG. 4.

The housing 28 may be of any suitable type and construction, e.g., a rigid polymer, a metal, a composite, or a combination of rigid materials. The housing 28 may house the airbag 30 in an uninflated position, as shown in FIGS. 1-2, and can support the airbag 30 in the inflated position, as shown in FIGS. 3-5. The airbag 30 may be rolled and/or folded to fit within the housing 28. The housing 28 may also provide a reaction surface for the airbag 30 when the airbag 30 deploys to the inflated position.

The airbag assembly 26 includes an inflator 84 for inflating the airbag 30, e.g., the first inflation chamber 38 of the first leg 32 and a second inflation chamber 56 of the second leg 52, may be supported by the housing 28 of the airbag assembly 26, as discussed below. Upon receiving a signal from, e.g., a vehicle controller, the inflator 84 may inflate the airbag 30 with an inflatable medium, such as a gas. The inflator 84 may be, for example, a pyrotechnic inflator that uses a chemical reaction to drive inflation medium to the airbag. The inflator 84 may be of any suitable type, for example, a cold-gas inflator.

Referring to FIG. 3, when the airbag 30 is in the inflated position, the second leg 52 of the airbag 30 is spaced from the seatback 14, and extends from the first leg 32 in the cross-seatback direction to the distal end 54 of the second leg 52. The second leg 52 extends from proximate the distal end 36 of the first leg 32 to the distal end 54 of the second leg 52. The second leg 52 has a second length L2, e.g., 16 inches, as shown in FIG. 4. The first length of the first leg 32 is greater than the second length L2 of the second leg 52.

As discussed above, the second leg 52 defines the second inflation chamber 56. The second inflation chamber 56 of the second leg 52 is in fluid communication with the first inflation chamber 38 of the first leg 32.

As shown in FIGS. 3-4, the panel 60 of the airbag 30 includes a first side 62 supported by the second leg 52 proximate the distal end 54, and a second side 64 supported by the housing 28 of the airbag 30. The first side 62 of the panel 60 has a length, e.g., 20 inches. The first side 62 can be fixed to the second leg 52 along the length such that in the inflated position, the length of the panel 60 extends in a substantially vertical direction relative the floor of the vehicle 10. The first side 62 can be fixed to the second leg 52 in any suitable manner, such as stitching, adhesives, chemical welding, staples, etc.

As discussed above, the second side 64 of the panel 60 can be supported by the housing 28 of the airbag assembly 26. For example, the second side 64 can be fixed to the housing 28 with, e.g., clips, fasteners, adhesives, etc. The first leg 32, the second leg 52 and the panel 60 may thus have a triangular shape, as shown in FIG. 4. Specifically, the first side 62 of the panel 60 is supported by the second leg 52 proximate the distal end 54 of the second leg 52, the second side 64 of the panel 60 is supported by the housing 28 adjacent where the proximal end 34 of the first leg 32 is supported, and the panel 60 is spaced from a location where the second leg 52 extends from proximate the distal end 36 of the first leg 32.

In this way, an occupant-facing surface 61 of the panel 60 can include a surface area of sufficient size and orientation such that a head, torso and extremities of the occupant may contact the occupant-facing surface 61 of the panel 60 during an impact event. As discussed above, the airbag 30 can thus assist in absorbing energy from the occupant, in assisting to divert the occupant from contacting other occupants during the impact, and in urging the occupant toward additional passive restraints in the vehicle 10

Referring to FIGS. 3-4, the airbag 30 can also include an external tether 68. The external tether 68 can have a first end 70 fixed to the first leg 32, e.g., a seatback-side of the first leg 32, and a second end 72 fixed to the seatback frame 16. The panel 60 of the airbag 30 can define an opening 66 through which the external tether 68 can extend when the airbag 30 is in the inflated position. The external tether 68 can assist in maintaining the airbag 30 in place relative to the vehicle seat 12, including when contacted by the occupant of the vehicle seat 12 following an impact.

The first end 70 of the external tether 68 can be fixed to the first leg 32 with stitching, adhesives, chemical welding, staples, etc., or in other suitable ways. The second end 72 of the external tether 68 can be fixed to the seatback frame 16 proximate the housing 28 of the airbag assembly 26. For example, for the airbag 30 supported by the housing 28 at the first side 18 of the seatback 14, the external tether 68 can be fixed to a location on the seatback frame 16 proximate the first side 18 of the seatback 14. For the airbag 30 supported by the housing 28 at the second side 20 of the seatback 14, the external tether 68 can be fixed to the seatback frame 16 proximate the second side 20 of the seatback 14. The second end 72 can be fixedly attached to the seatback frame 16 with fasteners, such as bolts, or in any other suitable manner.

Referring to FIGS. 4-5, one or more internal tethers can be included in the first inflation chamber 38 of the first leg 32 of the airbag 30. As shown in FIG. 5, in this example of the airbag 30, a first internal tether 40 and a second internal tether 46 are in the first inflation chamber 38. The first and second internal tethers 40, 46 include first ends 42, 48 supported by the distal end 36 of the first leg 32, and second ends 44, 50 supported by the housing 28 of the airbag 30. For example, the first ends 42, 48 of the first and second internal tethers 40, 46 can be fixed to an interior surface of the distal end 36 of the first leg 32, and the second ends 44, 50 can be fixed to the housing 28. As shown in FIG. 5, the first internal tether 40 can be fixed in a position above the second internal tether 46 relative to the floor of the vehicle 10. The first ends 42, 48 of the first and second internal tethers 40, 46 can be fixed to the interior surface of the distal end 36 of the first leg 32 with stitching, adhesives, chemical welding, staples, etc., or in other suitable ways. The second ends 44, 50 of the first and second internal tethers 40, 46 can be fixed to the interior of the housing 28 with, e.g., clips, fasteners, adhesives, etc.

The airbag 30 may include a plurality of baffles 58 spaced from each other throughout the first and second inflation chambers 38, 56. As shown in FIG. 5, the baffles 58 may be oval shaped, and can attach to an inner surface of the first and second legs 32, 52 of the airbag 30. Each of the baffles 58 can include one or more openings, e.g., two openings, through which, e.g., the first and second internal tethers 40, 46 of the first leg 32 can pass. The baffles 58 can provide greater stiffness to the first and second legs 32, 52 of the airbag 30 relative to the first and second legs 32, 52 without baffles 58.

For example, the baffles 58 as described above can secure the inner surface of the first and second legs 32, 52 such that the airbag 32 maintains its shape. The additional material provided by the baffles 58 can also increase stiffness of the airbag 30. Moreover, when the airbag 30 is inflating to the inflated position, the baffles 58 can limit the dispersion of an inflation medium through the first and second inflation chambers 38, 56, further increasing stiffness.

The airbag 30, including the first leg 32, the second leg 52, the panel 60, the exterior tether, the first and second internal tethers 40, 46, and the baffles 58, may be formed of any suitable airbag material, such as a woven polymer. For example, the airbag 30, the first leg 32, the second leg 52, the panel 60, the exterior tether, and the first and second internal tethers 40, 46 may be formed of woven nylon yarn, such as, nylon 6-6. Other materials include polyether ether ketone (PEEK), polyetherketoneketone (PEKK), polyester, and/or any other suitable polymer.

The airbag 30, including the first leg 32, the second leg 52, the panel 60, the external tether 68, and the first and second internal tethers 40, 46, may be formed of the same material, or may be formed from different materials.

For example, the first and second legs 32, 52 of the airbag 30 may be formed from materials having a low permeability to the inflation medium. The materials may have a higher denier and/or higher thread count than the materials used to form, e.g., the panel 60. Additionally, the first and second legs 32, 52 may include a coating, e.g., such as silicone, neoprene, urethane, and so on. The coating may be polyorgano siloxane.

Moreover, the first and second legs 32, 52 may not include vents. Airbags typically include vents to allow the inflation medium to readily exhaust from an interior of an inflation chamber to an exterior of the airbag such that the airbag can be readily deflated, among other things. The vents can be of any suitable type, such as an open vent, a one-way vent, a two-way vent, an active vent, etc Eliminating vents from the first and second legs 32, 52 of the airbags 30 disclosed herein, rendering the airbags 30 ventless, can further increase the stiffness of the airbags 30.

Figure 6:
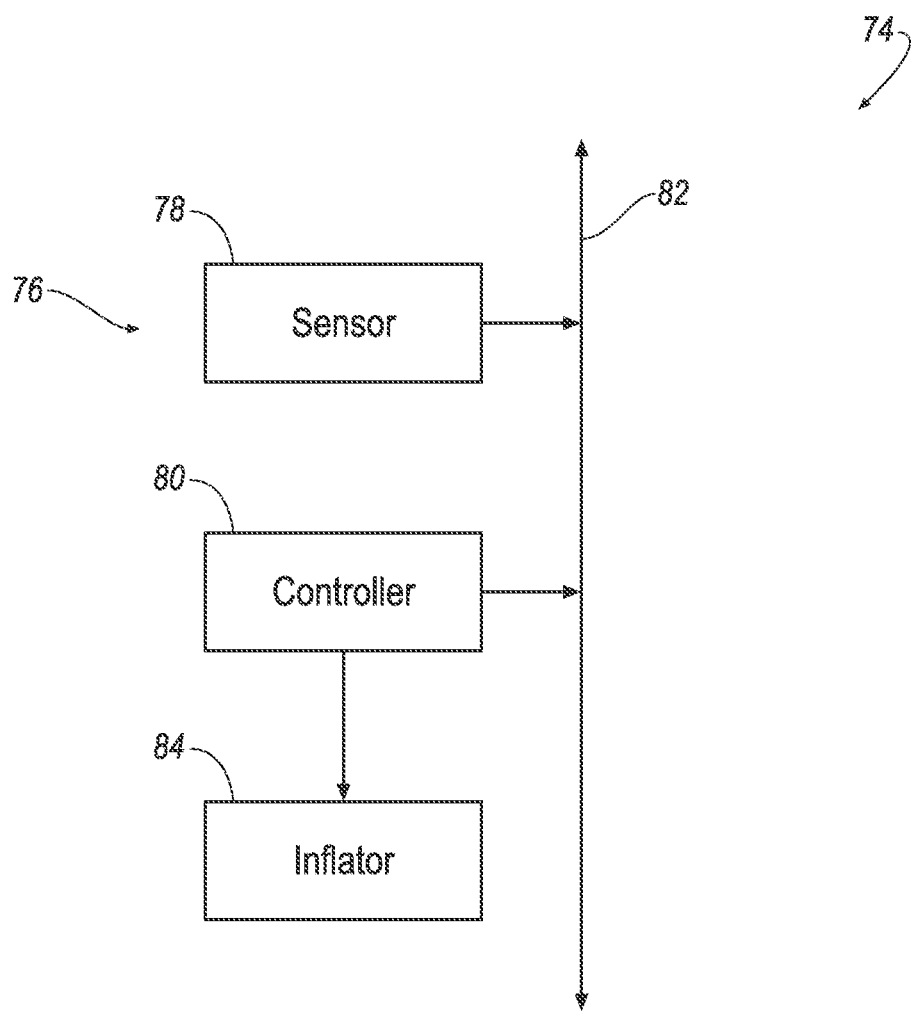
FIG. 6 is a schematic of the impact absorbing system of the vehicle.

A schematic of the passive restraint system 74 is shown in FIG. 6. The passive restraint system 74 can include an impact sensing system 76. The impact sensing system 76 may include at least one sensor 78. The sensor 78 is adapted to detect an impact to the vehicle 10. The impact sensor 78 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The sensor 78 may be located at numerous points in or on the vehicle 10 for sensing, e.g., an impact of the vehicle 10. The sensor 78 is the only component of the impact sensing system 76 shown in FIG. 6. It should be appreciated, however, that the impact sensing system 76 may include additional components not shown in FIG. 6.

The passive restraint system 74 may include a controller 80. The controller 80 and the sensor 78 may be connected to a communication bus 82, such as a controller area network (CAN) bus, of the vehicle 10. The controller 80 may use information from the communication bus 82 to control the activation of the inflator 84. The inflator 84 may be connected to the controller 80, as shown in FIG. 6, or may be connected directly to the communication bus 82.

The controller 80 may be in communication with the sensor 78 and the inflator 84, directly or through the communication bus 82, for activating the inflator 84, e.g., for providing an impulse to a pyrotechnic charge of the inflator 84, when the sensor 78 senses an impact of the vehicle 10. Additionally, or alternatively to sensing impacts, the impact sensing system 76 may be configured to sense impacts prior to impact, i.e., pre-impact sensing. The sensor 78 may be of any suitable type, e.g., using radar, LIDAR, and/or a vision system. The vision system may include one or more cameras, CCD image sensor, and/or CMOS image sensor, etc.

The controller 80 may be a microprocessor-based controller. The sensor 78 is in communication with the controller 80 to communicate data to the controller 80. Based on the data transmitted by the sensor 78, the controller 80 may instruct the inflator 84 to activate.

In operation, the airbag 30 is in the uninflated position, as shown in FIGS. 1-2, under normal operating conditions of the vehicle 10. When the sensor 78 senses an impact of the vehicle 10, the impact sensing system 76 triggers communication to the controller 80 identifying the impact. In response, the controller 80 may instruct the inflator 84 to inflate the airbag 30 with the inflation medium, deploying the airbag from the uninflated position to the inflated position.

Based on the type of impact sensed by the impact sensing system 76, the controller 80 may selectively deploy the airbag 30 of the airbag assembly 26 supported at the first side 18 of the seatback 14 to deploy to the inflated position, while not deploying the airbag 30 of the airbag assembly 26 supported at the second side 20 of the seatback 14. For example, in the examples of the airbag assembly 26 of FIGS. 3-5, the controller 80 has deployed the airbag 30 of the airbag assembly 26 supported at the first side 18 of the seatback 14 to deploy, while not deploying the airbag 30 of the airbag assembly 26 supported at the second side 20.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle seat comprising:
a seatback extending from a first side to a second side;
an airbag assembly having a housing supported by the seatback at one of the first and second sides, and an airbag inflatable from the housing to an inflated position;
the airbag in the inflated position having a first leg extending away from the seatback and a second leg spaced from the seatback, and extending from the first leg in a cross-seatback direction to a distal end of the second leg; and
a panel extending from the distal end to the housing.

2. The vehicle seat of claim 1, wherein the first leg defines a first inflation chamber and the second leg defines a second inflation chamber, and the first and second inflation chambers are in fluid communication with each other.

3. The vehicle seat of claim 1, wherein the panel has a length, and a first side of the panel is fixed to the second leg along the length of the panel, and further wherein when the airbag is in the inflated position, the length of the panel is oriented in a substantially vertical direction.

4. The vehicle seat of claim 1, further comprising an external tether extending through an opening defined by the panel, the external tether having a first end fixed to a seatback side of the first leg and a second end fixed to a seatback frame proximate the housing.

5. The vehicle seat of claim 1, wherein when the airbag is in the inflated position, the first leg has a first length in a vehicle-forward direction greater than a second length of the second leg in the cross-seatback direction.

6. The vehicle seat of claim 1, wherein a surface of the airbag is ventless between an interior and an exterior of the airbag.

7. The vehicle seat of claim 2, wherein the airbag further comprising baffles in the first and second inflation chambers.

8. The vehicle seat of claim 2, wherein the first leg of the airbag further comprises first and second internal tethers in the first inflation chamber, the internal tethers having first ends fixed to a distal end of the first inflation chamber and second ends fixed to the housing.

9. The vehicle seat of claim 1 further comprising:
another airbag assembly supported by the seatback at the other of the first and second sides.

10. An airbag assembly comprising:
a housing;
an airbag inflatable from the housing to an inflated position;
an inflator in fluid communication with the airbag;
the airbag in the inflated position having a first leg extending away from the housing and a second leg extending from the first leg to a distal end of the second leg in a direction substantially perpendicular to the first leg; and
a panel extending from the distal end to the housing.

11. The airbag assembly of claim 10, wherein the first leg defines a first inflation chamber and the second leg defines a second inflation chamber, and the first and second inflation chambers are in fluid communication with each other.

12. The airbag assembly of claim 10, wherein the panel has a length, and a first side of the panel is fixed to the second leg along the length of the panel, and further wherein when the airbag is in the inflated position, the length is at least 10 inches.

13. The airbag assembly of claim 10, further comprising an external tether extending through an opening defined by the panel, the external tether having a first end fixed to a seatback side of the first leg and a second end fixable to a seatback frame proximate to the housing.

14. The airbag assembly of claim 10, wherein when the airbag is in the inflated position, the first leg has a length in a vehicle-forward direction greater than a length of the second leg in the direction substantially perpendicular to the first leg.

15. The airbag assembly of claim 10, wherein a surface of the airbag is ventless between an interior and an exterior of the airbag.

16. The airbag assembly of claim 11, further comprising baffles in the first and second inflation chambers.

17. The airbag assembly of claim 11, further comprising first and second internal tethers in the first inflation chamber, the internal tethers having first ends fixed to a distal end of the first inflation chamber and second ends fixed to the housing.

* * * * *